United States Patent
Mukasa

(10) Patent No.: US 11,624,871 B2
(45) Date of Patent: Apr. 11, 2023

(54) OPTICAL FIBER

(71) Applicant: FURUKAWA ELECTRIC CO., LTD., Tokyo (JP)

(72) Inventor: Kazunori Mukasa, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/232,221

(22) Filed: Apr. 16, 2021

(65) Prior Publication Data
US 2021/0231864 A1 Jul. 29, 2021

Related U.S. Application Data

(63) Continuation of application No. PCT/JP2019/042179, filed on Oct. 28, 2019.

(30) Foreign Application Priority Data

Oct. 30, 2018 (JP) .............................. JP2018-204298

(51) Int. Cl.
  *G02B 6/036* (2006.01)
  *C03C 3/06* (2006.01)
  *G02B 6/02* (2006.01)

(52) U.S. Cl.
  CPC ............... *G02B 6/036* (2013.01); *C03C 3/06* (2013.01); *G02B 6/02395* (2013.01)

(58) Field of Classification Search
  CPC ........ G02B 6/036; G02B 6/02395; C03C 3/06
  See application file for complete search history.

(56) References Cited

U.S. PATENT DOCUMENTS 9,746,605 B2  8/2017 Sohma et al.
9,964,697 B2  5/2018 Maruyama et al.
(Continued)

FOREIGN PATENT DOCUMENTS

EP  3 098 631 A1  11/2016
JP  05-019144 A  1/1993
(Continued)

OTHER PUBLICATIONS

John A. Jay, An Overview of Macrobending and Microbending of Optical Fibers, Corning, WP1212, 2010; https://www.corning.com/media/worldwide/coc/documents/Fiber/white-paper/WP1212.pdf (Year: 2010).*

(Continued)

*Primary Examiner* — Peter Radkowski
(74) *Attorney, Agent, or Firm* — Oblon, McClelland, Maier & Neustadt, L.L.P.

(57) ABSTRACT

An object is to obtain an optical fiber having a small diameter and suppressing the increase of a microbending loss of the optical fiber. The optical fiber includes: a core portion made of silica glass; a cladding portion made of silica glass, the cladding portion covering the outer periphery of the core portion and having a refractive index smaller than a maximum refractive index of the core portion; and a coating portion covering the outer periphery of the cladding portion. The outer diameter of the cladding portion is 100 μm or smaller, the relative refractive-index difference Δ1 of the core portion is 0.5% or smaller, and the thickness of the coating portion is 10 μm or larger.

10 Claims, 4 Drawing Sheets

(56) References Cited

U.S. PATENT DOCUMENTS

| | | | |
|---|---|---|---|
| 9,989,699 B2* | 6/2018 | Bennett | G02B 6/03655 |
| 2005/0031283 A1* | 2/2005 | Fabian | G02B 6/02395 |
| | | | 385/128 |
| 2006/0034575 A1 | 2/2006 | Sako et al. | |
| 2009/0175583 A1* | 7/2009 | Overton | C03C 25/106 |
| | | | 385/100 |
| 2011/0058780 A1 | 3/2011 | Han et al. | |
| 2014/0308015 A1 | 10/2014 | Bookbinder et al. | |
| 2016/0306107 A1* | 10/2016 | Bickham | G02B 6/02395 |
| 2018/0120503 A1* | 5/2018 | Bennett | G02B 6/02333 |
| 2019/0384000 A1 | 12/2019 | Tamura et al. | |

FOREIGN PATENT DOCUMENTS

| | | |
|---|---|---|
| JP | 2007-033466 A | 2/2007 |
| JP | 2013-125064 A | 6/2013 |
| JP | 2015-219271 A | 12/2015 |
| JP | 2016-522428 A | 7/2016 |
| WO | WO 2016/190297 A1 | 12/2016 |
| WO | 2017/206616 A1 | 12/2017 |
| WO | WO 2018/159146 A1 | 9/2018 |

OTHER PUBLICATIONS

International Search Report dated Jan. 7, 2020 in PCT/JP2019/042179 filed on Oct. 28, 2019, 2 pages.

Murase et al., "Development of Small Diameter Optical Fiber", Electric wire review of SWCC Showa Holdings Co., Ltd., vol. 53, No. 1, 2003, 16 pages (with English Machine Translation).

Extended European Search Report dated Jun. 9, 2022 in European Application No. 19880435.3, 11 pages.

* cited by examiner

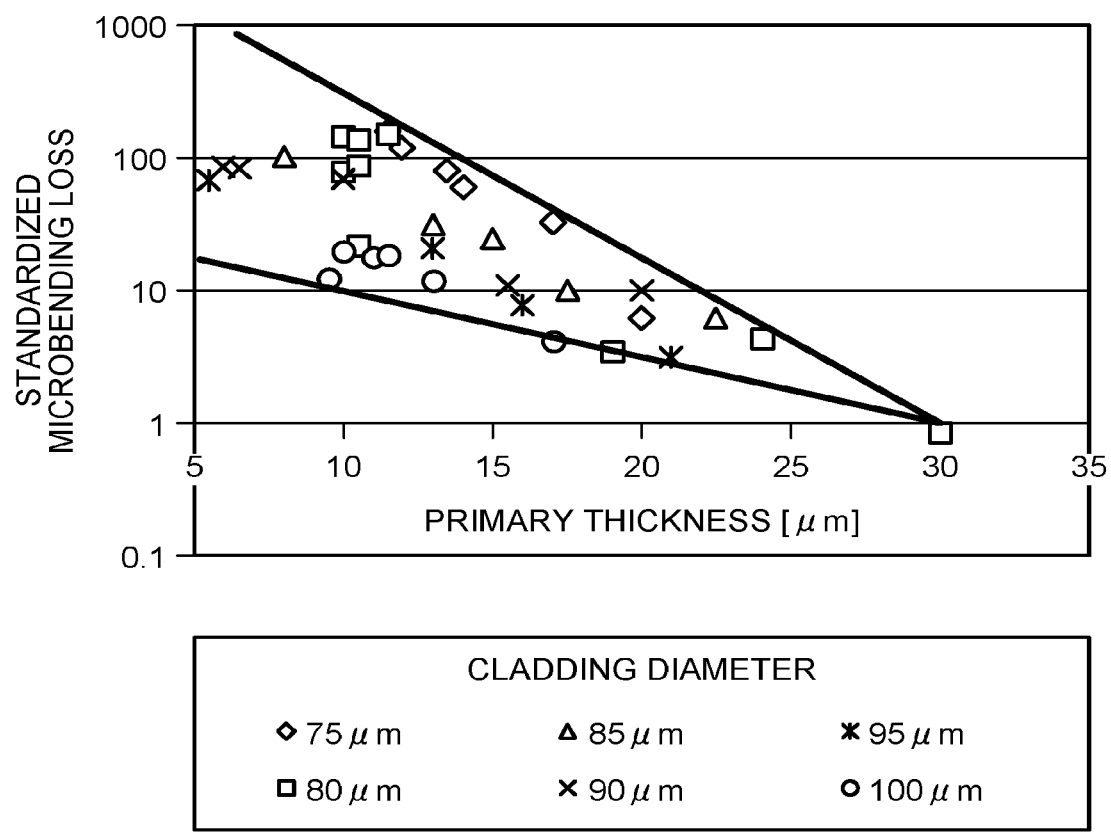

OPTICAL FIBER

CROSS-REFERENCE TO RELATED APPLICATION(S)

This application is a continuation of International Application No. PCT/JP2019/042179, filed on Oct. 28, 2019 which claims the benefit of priority of the prior Japanese Patent Application No. 2018-204298, filed on Oct. 30, 2018, the entire contents of which are incorporated herein by reference.

BACKGROUND

The present disclosure relates to an optical fiber.

In the fields of data communication and telecommunications, the small-diameter optical fiber has been attracting attention as an optical fiber achieving a high density optical fiber cable. Here, the small-diameter optical fiber is mainly an optical fiber in which a part made of glass is reduced in diameter so that a cladding diameter is small. However, the small-diameter optical fiber also includes an optical fiber in which the outer diameter including a coating portion formed to cover the outer periphery of the cladding portion is reduced.

Conventionally, there is disclosed, as the small-diameter optical fiber, the configuration in which the relative refractive-index difference of the core portion relative to the cladding portion is increased (T. Murase, et al. "Development of Small Diameter Cladding Fiber", Review of Showa Electric Wire and Cable Review, Vol. 53, No. 1, pp. 32-36 (2003)). In the optical fiber of T. Murase, et al. "Development of Small Diameter Cladding Fiber", Review of Showa Electric Wire and Cable Review, Vol. 53, No. 1, pp. 32-36 (2003), the relative refractive-index difference is increased. Thus, such characteristics do not conform to the standard of a standard single mode optical fiber defined by International Telecommunication Union Telecommunication Standardization Sector (ITU-T) G.652 (hereinafter, referred to as the G.652 standard). Moreover, as the small-diameter optical fiber, there is disclosed the configuration in which a trench layer having a relative refractive-index difference of −0.08% or larger is provided (International Publication No. WO 2016/190297). The optical fiber of International Publication No. WO 2016/190297 conforms to the G.652 standard, and the cladding diameter (fiber diameter) is around 100 μm to 125 μm. Moreover, as the small-diameter optical fiber, there is disclosed the configuration in which a primary coating layer and a secondary coating layer are provided as the coating portion, and the secondary coating layer is 25 μm or smaller (Japanese Laid-open Patent Publication No. H5-19144). Although the optical fiber of Japanese Laid-open Patent Publication No. H5-19144 has a fiber diameter of 125 μm, a small diameter thereof is achieved by reducing the coating.

Moreover, Japanese Laid-open Patent Publication No. 2015-219271 discloses the configuration in which the microbending loss is suppressed in the optical fiber having a relatively larger effective core area (Aeff) of 130 μm$^2$ or longer. In the optical fiber of Japanese Laid-open Patent Publication No. 2015-219271, the outer diameter of a primary coating layer is not smaller than 185 μm and not larger than 220 μm, and the outer diameter of a secondary coating layer is not smaller than 225 μm and not larger than 260 μm.

SUMMARY

There is a need for providing the optical fiber having a small diameter and suppressing the increase of a microbending loss of the optical fiber.

According to an embodiment, an optical fiber includes: a core portion that is made of silica glass; a cladding portion that is made of silica glass, the cladding portion covering an outer periphery of the core portion and having a refractive index smaller than a maximum refractive index of the core portion; and a coating portion that covers the outer periphery of the cladding portion. Further, an outer diameter of the cladding portion is 100 μm or smaller, a relative refractive-index difference Δ1 of the core portion is 0.5% or smaller, and a thickness of the coating portion is 10 μm or larger.

BRIEF DESCRIPTION OF DRAWINGS

FIG. 5 is a diagram illustrating an example of the relationship between a primary thickness and a standardized microbending loss.

DETAILED DESCRIPTION

Figure 1:
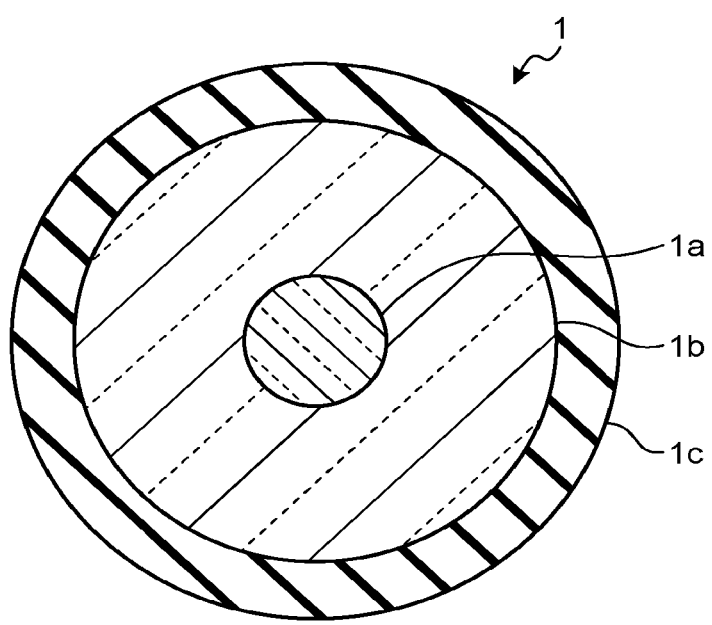
FIG. 1 is a schematic section view of an optical fiber according to an embodiment.

In the related art, if the cladding diameter of an optical fiber made of silica glass is reduced to be 100 μm or smaller, for example, it is considered that the reduction in diameter affects a microbending loss of the optical fiber, so that the microbending loss is increased. Particularly, the increase of the microbending loss is remarkable in the optical fiber having the characteristics conforming to the G.652 standard or close to such characteristics, which is the optical fiber practically used most.

The following will specifically describe an embodiment of the disclosure with reference to the drawings. Note that the embodiment described in the following does not limit the disclosure. Moreover, in the drawings, the same or corresponding components are represented with the same reference signs as appropriate. Moreover, in the specification, the cutoff wavelength is a cable cutoff wavelength defined by ITU-T G.650.1. Furthermore, other terms not defined especially in this specification conform to the definitions and measurement methods in the G.650.1 and the G.650.2.

Embodiment

FIG. 1 is a schematic section view of an optical fiber according to an embodiment. An optical fiber 1 includes a substantially center positioned core portion 1a, a cladding portion 1b covering the outer periphery of the core portion 1a, and a coating portion 1c covering the outer periphery of the cladding portion 1b.

Both the core portion 1a and the cladding portion 1b are made of silica glass. For example, the core portion 1a is made of quarts glass to which a dopant for refractive index adjustment, such as germanium (Ge) or fluorine (F), is added. The cladding portion 1b has a refractive index lower than the maximum refractive index of the core portion 1a. The cladding portion 1b is made of pure silica glass not including a dopant for refractive index adjustment, for example.

The outer diameter of the cladding portion 1b (cladding diameter) is 100 μm or smaller, and is preferably smaller than 100 μm, so as to be smaller than approximately 125 μm that is the cladding diameter of a single mode optical fiber conforming to the G.652 standard. Note that the cladding diameter is more preferably 95 μm or smaller in the viewpoint of reducing a diameter. In the following, the single mode optical fiber conforming to the G.652 standard may be described as a standard SMF as a standard optical fiber. Such a standard SMF normally includes, on the outer periphery of the cladding portion, a resin coating portion having a thickness of approximately 62.5 μm. Therefore, the outer diameter of the resin coating portion is approximately 250 μm.

Figure 2A:
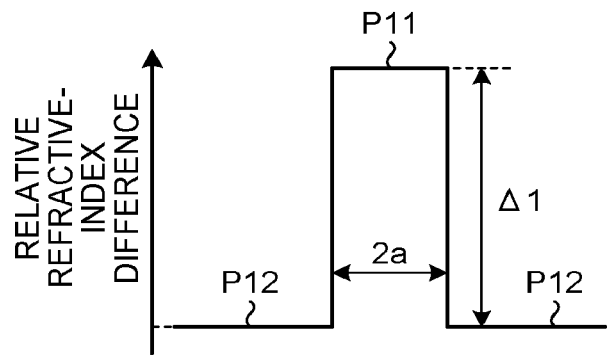
FIG. 2A is a schematic view of a step-type refractive index profile that can be used in the optical fiber according to the embodiment.
Figure 2B:
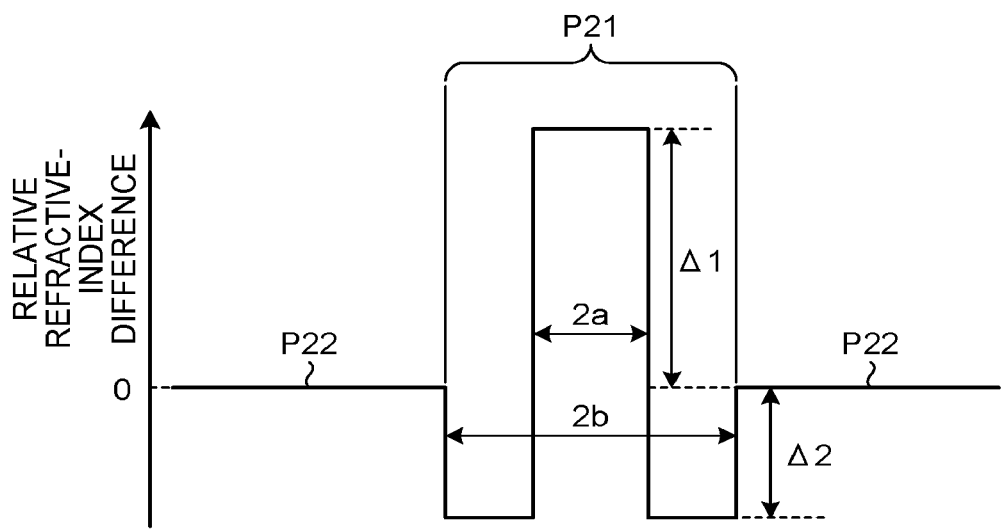
FIG. 2B is a schematic view of a W-type refractive index profile that can be used in the optical fiber according to the embodiment.
Figure 2C:
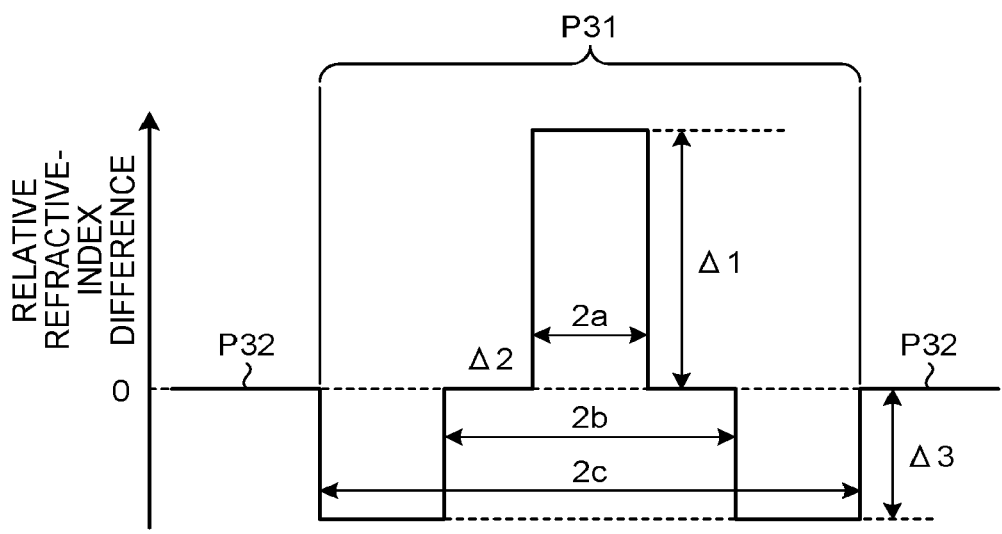
FIG. 2C is a schematic view of a trench-type refractive index profile that can be used in the optical fiber according to the embodiment.

The optical fiber 1 has refractive index profiles illustrated in FIG. 2A, FIG. 2B, and FIG. 2C, for example. Any of FIG. 2A, FIG. 2B, and FIG. 2C illustrates a refractive index profile in the radius direction from the center axis of the core portion 1a of the optical fiber 1.

FIG. 2A illustrates a step-type refractive index profile. In FIG. 2A, the profile P11 illustrates a refractive index profile of the core portion 1a, and the profile P12 illustrates a refractive index profile of the cladding portion 1b. Note that the refractive index profile is illustrated by a relative refractive-index difference with respect to the cladding portion 1b. In the step-type refractive index profile, the diameter of the core portion 1a (core diameter) is 2a, and the relative refractive-index difference of the core portion 1a with respect to the cladding portion 1b is Δ1.

FIG. 2B illustrates a so-called W-type refractive index profile. In FIG. 2B, the profile P21 illustrates a refractive index profile of the core portion 1a, and the profile P22 illustrates a refractive index profile of the cladding portion 1b. In the W-type refractive index profile, the core portion 1a includes a center core section having a diameter of 2a, and a depressed layer surrounding the outer periphery of the center core section, having a refractive index smaller than that of the cladding portion, and having an inner diameter of 2a and an outer diameter of 2b. The relative refractive-index difference of the center core section with respect to the cladding portion 1b is Δ1. The relative refractive-index difference of the depressed layer with respect to the cladding portion 1b is Δ2.

FIG. 2C illustrates a so-called trench-type refractive index profile. In FIG. 2C, the profile P31 illustrates a refractive index profile of the core portion 1a, and the profile P32 illustrates a refractive index profile of the cladding portion 1b. In the trench-type refractive index profile, the core portion 1a includes a center core section having a diameter of 2a, an intermediate layer surrounding the outer periphery of the center core section, having a refractive index smaller than that of the center core section, and having an inner diameter of 2a and an outer diameter of 2b, and a trench layer surrounding the outer periphery of the intermediate layer, having a refractive index smaller than that of the cladding portion, and having an inner diameter of 2b and an outer diameter of 2c. The relative refractive-index difference of the center core section with respect to the intermediate layer is Δ1. The relative refractive-index difference of the intermediate layer relative to the cladding portion 1b is Δ2. Note that Δ2 is normally set to 0% or the vicinity thereof, in a range between −0.2% and 0.2%, for example. The relative refractive-index difference of the trench layer with respect to the cladding portion 1b is Δ3.

Returning to FIG. 1, the coating portion 1c is made of resin, for example, and has a function of protecting the glass part of the optical fiber 1. The coating portion 1c is made of UV curing resin or the like, for example, and has a layer structure of one layer or two or more layers. In a case where the coating portion 1c has a two-layer structure, the coating portion 1c includes a primary coating layer positioned on the cladding portion side, and a secondary coating layer positioned on the outer periphery side of the primary coating layer. The examples of the UV curing resin used for the coating portion 1c include urethane acrylate-based, polybutadiene acrylate-based, epoxy acrylate-based, silicone acrylate-based, polyester acrylate-based, and the like. However, the resin is not limited thereto as long as it is to be used for coating an optical fiber.

In a case where the coating portion 1c has a one-layer structure, the Young's modulus is around 10 to 800 MPa, and is 200 MPa in the embodiment. Meanwhile, in a case where the coating portion 1c has the two-layer structure, the Young's modulus of the primary coating layer is around 0.2 to 1.5 MPa, and is 0.5 MPa in the embodiment. The Young's modulus of the secondary coating layer is around 500 to 2000 MPa, and is 1000 MPa in the embodiment.

The thickness of the coating portion 1c is 10 μm or larger, and particularly in the case of the two-layer structure, the thickness of the primary coating layer is 10 μm or larger.

With the above-described configuration, the optical fiber 1 according to the embodiment includes the cladding portion 1b having a small diameter of 100 μm or smaller, and suppresses the increase of a microbending loss of the optical fiber. Therefore, the optical fiber 1 is preferable to achieve a high-density optical fiber cable.

The following is the concrete description. The inventors discussed the following in order to achieve a small-diameter optical fiber suppressing the increase of a microbending loss thereof.

First, to achieve a small-diameter optical fiber, it is important that the leakage loss (leak loss) is small. The leakage loss is preferably suppressed to 0.001 dB/km or smaller at a wavelength of 1625 nm, for example. Moreover, to suppress the connection loss at the time of optical connection between a small-diameter optical fiber and a standard SMF, it is preferable that the mode field diameter (MFD) at a wavelength of 1550 nm of the small-diameter optical fiber is 9 μm or larger. Thus, for the cases of three kinds of refractive index profiles exemplified in FIG. 2, simulation calculation was performed with the various combinations of parameters related to the refractive index profiles illustrated in FIG. 2, so as to calculate the optical characteristics of the optical fiber in each combination. Then, there were investigated, by simulation calculation, a minimum cladding diameter (limit fiber diameter) allowing the leakage loss to be 0.001 dB/km or smaller at a wavelength of 1625 nm, and an MFD at a wavelength of 1550 nm. Note that it is considered that with a smaller limit fiber diameter, the combination of parameters is more preferable for reducing the diameter of the optical fiber.

Table 1 illustrates the ranges of values used for simulation calculation regarding Δ1, Δ2, Δ3, b/a, and c/a that are parameters illustrated in FIG. 2. Note that 2a is a value in a range of 6.5 μm to 10 μm.

TABLE 1

| | $\Delta_1$ [%] | $\Delta_2$ [%] | $\Delta_3$ [%] | b/a | c/a |
|---|---|---|---|---|---|
| Step-type | 0.20 to 0.65 | — | — | — | — |
| W-type | | −0.7 to −0.1 | — | 1.5 to 6.0 | — |
| Trench-type | | −0.2 to 0.2 | −0.7 to −0.1 | 1.5 to 5.0 | 2.0 to 7.0 |

Figure 3:
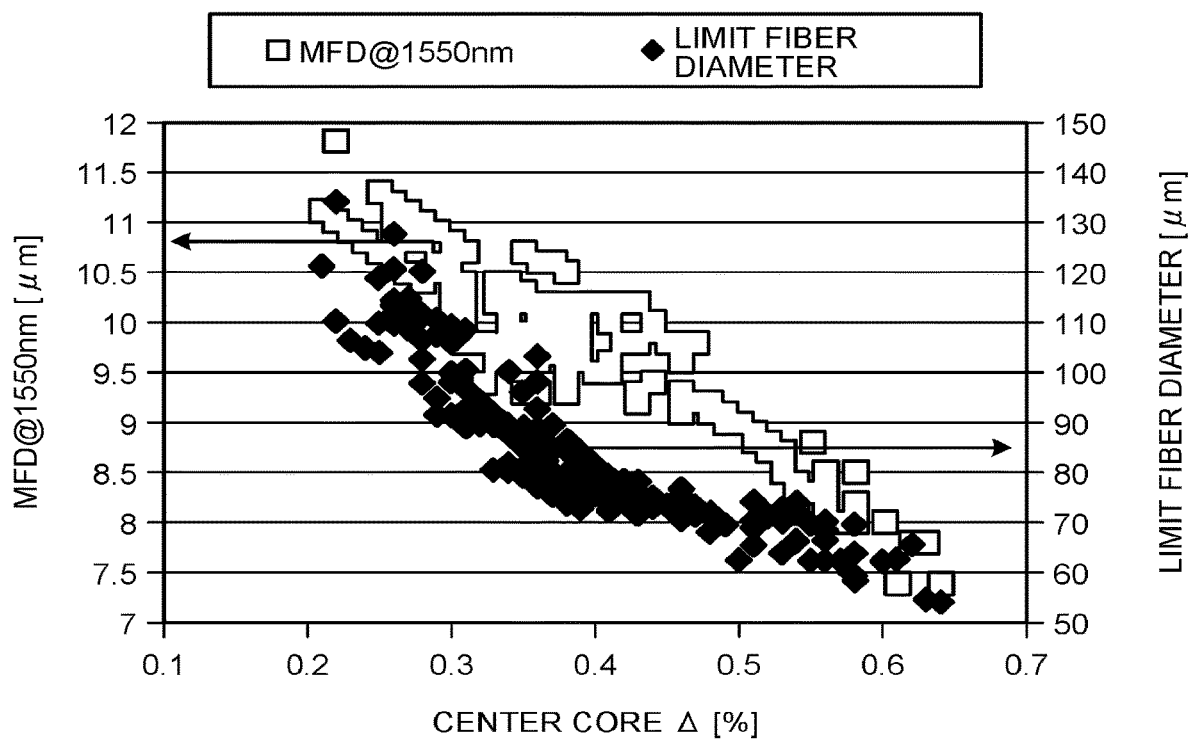
FIG. 3 is a diagram illustrating an example of the relationship between a center core Δ and a mode field diameter or a limit fiber diameter.

FIG. 3 is a diagram illustrating an example of the relationship between a center core Δ and an MFD or a limit fiber diameter, based on the above-described calculation results. Here, the center core Δ indicates Δ1. Moreover, FIG. 3 plots only data where the cutoff wavelength is 1530 nm or smaller in the result of simulation calculation. Furthermore, FIG. 3 omits, regarding the data points illustrated as explanatory notes of a white square or a black rhombus, the illustration of the outlines of parts where the outlines of the data points are overlapped. Moreover, FIG. 3 does not distinguish explanatory notes depending on refractive index profiles, which indicates that FIG. 3 exhibits the tendency not depending on the refractive index profiles.

As is clear from FIG. 3, to achieve the MFD at a wavelength of 1550 nm of 9 μm or larger, the center core Δ (Δ1) is preferably 0.5% or smaller regardless of refractive index profiles. Moreover, to achieve the limit fiber diameter of 100 μm or smaller, the center core Δ is preferably 0.25% or larger. To achieve the limit fiber diameter of 95 μm or smaller, the center core Δ is preferably 0.3% or larger. Therefore, Δ1 is preferably 0.5% or smaller, and 0.25% or larger, or more preferably 0.3% or larger. Note that Δ1 is preferably 0.25% or larger from the viewpoint of achieving the MFD of 10.5 μm or smaller at a wavelength of 1550 nm of the small-diameter optical fiber and reducing a difference from the MFD of the standard SMF. In this manner, a difference between MFDs of two optical fibers is reduced to secure the compatibility such as connection characteristics of two optical fibers.

Note that examples of the optical fiber the compatibility of which is to be improved by making the MFD of a small-diameter optical fiber closer include the following optical fibers other than the standard SMF, for example. That is, the examples include an optical fiber conforming to the G.654 standard of ITU-T (so-called cutoff shift optical fiber), an optical fiber conforming to the G.657 standard (so-called bending resistant optical fiber), and the like. Therefore, as the characteristics of the small-diameter optical fiber, the MFD at a wavelength of 1310 nm is preferably in a range of 8.0 μm to 10.0 μm. Note that in the G.652 standard, the MFD at a wavelength of 1310 nm is within a range of 8.6 μm to 9.5 μm.

The following will describe the examination result of microbending losses. Generally, the transmission loss of the optical fiber is increased in the state of an optical fiber cable. The increase amount of the transmission loss here is closely correlated with the microbending loss, and the increase amount becomes larger with a larger microbending loss.

To examine the microbending loss of the small-diameter optical fiber, there was first examined the degree of a microbending loss in the optical fiber having a large Aeff (also called as an Aeff enlarged optical fiber), which is currently used practically for a use of a submarine optical cable and the like.

Figure 4:
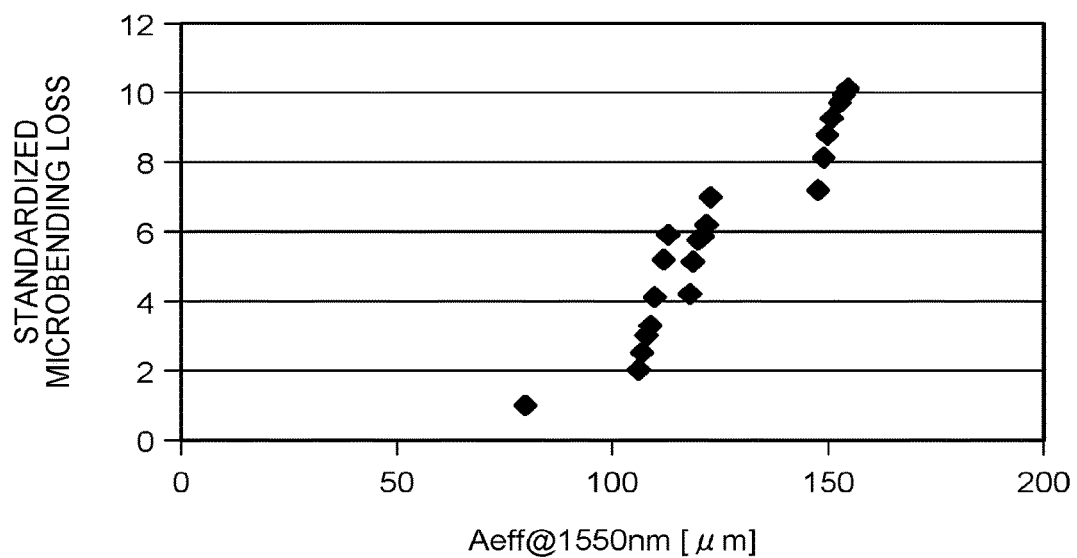
FIG. 4 is a diagram illustrating an example of the relationship between an effective core area and a standardized microbending loss.

FIG. 4 is a diagram illustrating an example of the relationship between Aeffs at a wavelength of 1550 nm of the standard SMF and some Aeff enlarged optical fibers, and standardized microbending losses. Here, the standardized microbending loss is a value obtained by standardizing the microbending loss of a certain optical fiber by the microbending loss of a standard SMF. Note that the Aeff of the standard SMF is about 80 μm², and the standardized microbending loss of the standard SMF itself is 1. Note that in the standard SMF, the cladding portion includes, on the outer periphery thereof, a resin coating portion having a two-layer structure with a thickness of about 62.5 μm.

It is also practically preferable to suppress the microbending loss of the small-diameter optical fiber to the degree of the microbending loss of a practically used Aeff enlarged optical fiber having an Aeff of around 150 μm² or smaller. Therefore, as is understood from FIG. 4, the standardized microbending loss is preferably 10 or smaller, and is more preferably 5 or smaller. That is, the microbending loss of the small-diameter optical fiber is preferably 10 times or smaller than that of the standard SMF, and is more preferably five times or smaller than that of the standard SMF. Note that the microbending losses illustrated in FIG. 4 are measured by the fixed diameter drum method (a kind of the abrasive-paper method) defined by JIS C6823:2010_10.

On the basis of the above-described examination results, the refractive index profiles were set to a step-type, a W-type, or a trench-type, and the design parameters such as Δ1 in each profile were optimized by simulation calculation. Here, the optimization indicates the optimization of the compatibility relative to an optical fiber defined by the G.652 standard, the G.654 standard, or the G.657 standard. On the basis of the results of this simulation calculation, there were produced a plurality of small-diameter optical fibers having a cladding diameter of a different value in a range of 75 μm to 100 μm. Note that the coating portion was formed to have a two-layer structure of a primary coating layer and a secondary coating layer. The Young's modulus of the primary coating layer was set to 0.5 Mpa, and the Young's modulus of the secondary coating layer was set to 1000 MPa. The thickness of the secondary coating layer was set to 120 μm, and the thickness of the primary coating layer was set to different values in a range of 5 μm to 30 μm. Then, the microbending losses of such produced small-diameter optical fibers were measured by the fixed diameter drum method.

FIG. 5 is a diagram illustrating an example of the relationship between a primary thickness and a standardized microbending loss in the above-described measurements. Here, the primary thickness is the thickness of the primary coating layer. As illustrated in FIG. 5, the primary thickness needs to be 10 μm or larger so as to achieve the standardized microbending loss of 10 or smaller. That is, the thickness of the coating portion needs to be 10 μm or larger. Moreover, if the primary thickness is 30 μm, the standardized microbending loss can be around 1, and thus the primary thickness may be 30 μm or smaller. In addition, it was also confirmed that with little correlation existing between the thickness of the secondary coating layer and the standardized microbending loss, the primary thickness is important.

Note that in the above-described embodiment, a step-type, a W-type, and a trench-type are exemplified as the refractive index profiles. However, it is also possible to apply other refractive index profiles such as a segment core-type and a W+side core-type.

The above-described embodiment does not limit the disclosure. The disclosure also includes embodiments by combining the above-described components as appropriate. In addition, the further effects and modifications can be derived easily by a person skilled in the art. Therefore, a wider range of aspects of the disclosure is not limited to the above-described embodiment, and various changes can be made.

INDUSTRIAL APPLICABILITY

The optical fiber according to the disclosure is preferably used in optical communication fields such as data communication and telecommunications.

REFERENCE SIGNS LIST

The present disclosure exerts the effect of achieving the optical fiber having a small diameter and suppressing the increase of a microbending loss of the optical fiber.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. An optical fiber, comprising:
a core portion that is made of silica glass;
a cladding portion that is made of silica glass, the cladding portion covering an outer periphery of the core portion and having a refractive index smaller than a maximum refractive index of the core portion; and
a coating portion that covers the outer periphery of the cladding portion, wherein
an outer diameter of the cladding portion is 100 μm or smaller,
a relative refractive-index difference Δ1 of the core portion is 0.5% or smaller,
a thickness of the coating portion is 10 μm or larger,
the coating portion includes a primary coating layer positioned on a side of the cladding portion and a secondary coating layer positioned on an outer periphery side of the primary coating layer,
the thickness of the primary coating layer is 10 μm or larger and 30 μm or smaller, and
a microbending loss at a wavelength of 1550 nm is equal to or smaller than ten times the microbending loss at a wavelength of 1550 nm of a standard optical fiber having characteristics conforming to a standard defined by ITU-T G.652 and including a resin coating portion with a thickness of 62.5 μm on the outer periphery of the cladding portion.

2. The optical fiber according to claim 1, wherein the outer diameter of the cladding portion is 95 μm or smaller.

3. The optical fiber according to claim 1, wherein the microbending loss is a value measured by an abrasive-paper method.

4. The optical fiber according to claim 1, wherein the optical fiber has a step-type refractive index profile.

5. The optical fiber according to claim 1, wherein the optical fiber has a W-type refractive index profile.

6. The optical fiber according to claim 1, wherein the optical fiber has a trench-type refractive index profile.

7. The optical fiber according to claim 1, wherein a mode field diameter at a wavelength of 1310 nm is in a range of 8.0 μm to 10.0 μm.

8. The optical fiber according to claim 1, wherein a mode field diameter at a wavelength of 1550 nm is 9 μm or larger.

9. The optical fiber according to claim 1, wherein the relative refractive-index difference Δ1 of the core portion is 0.25% or larger.

10. The optical fiber according to claim 1, wherein a leakage loss is suppressed to 0.001 dB/km or smaller at a wavelength of 1625 nm.

\* \* \* \* \*